June 13, 1961
R. F. ENSIGN
2,988,075
COMBINED PRESSURE REGULATOR AND FUEL HEATER AND VAPORIZER
Filed June 12, 1959
3 Sheets-Sheet 1
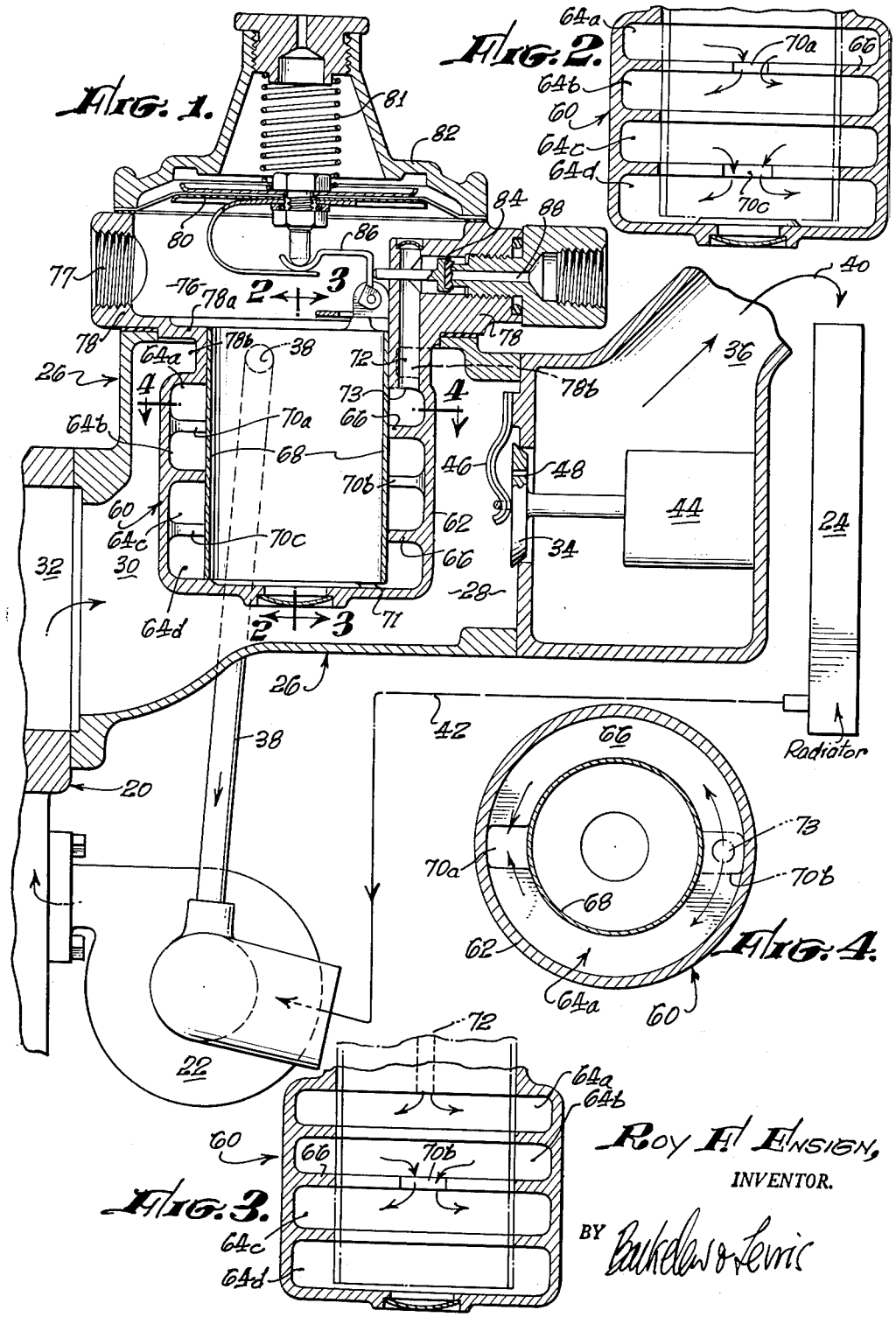
Roy F. Ensign,
INVENTOR.
BY Bakelew & Lewis

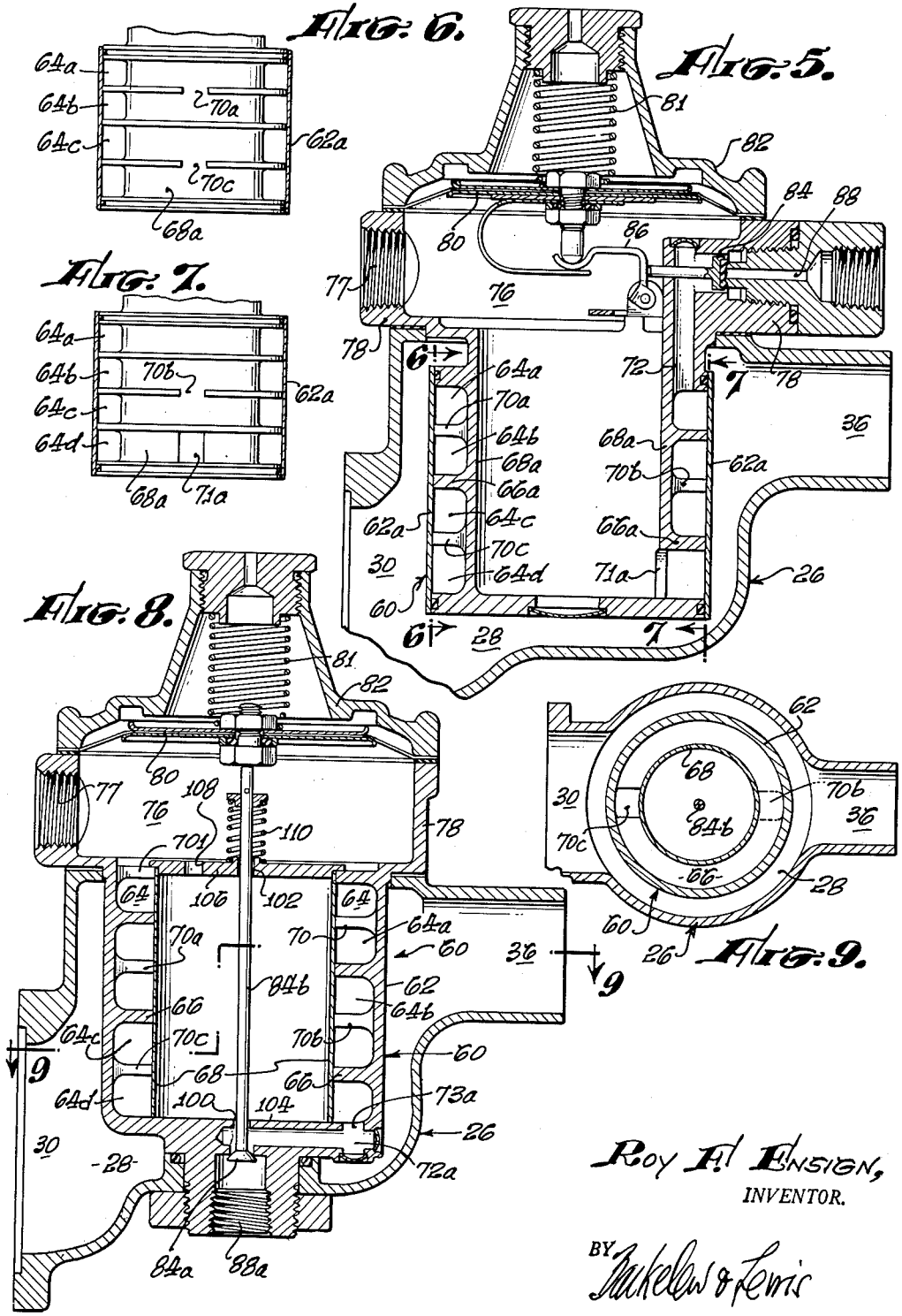

June 13, 1961 R. F. ENSIGN 2,988,075
COMBINED PRESSURE REGULATOR AND FUEL HEATER AND VAPORIZER
Filed June 12, 1959 3 Sheets-Sheet 3
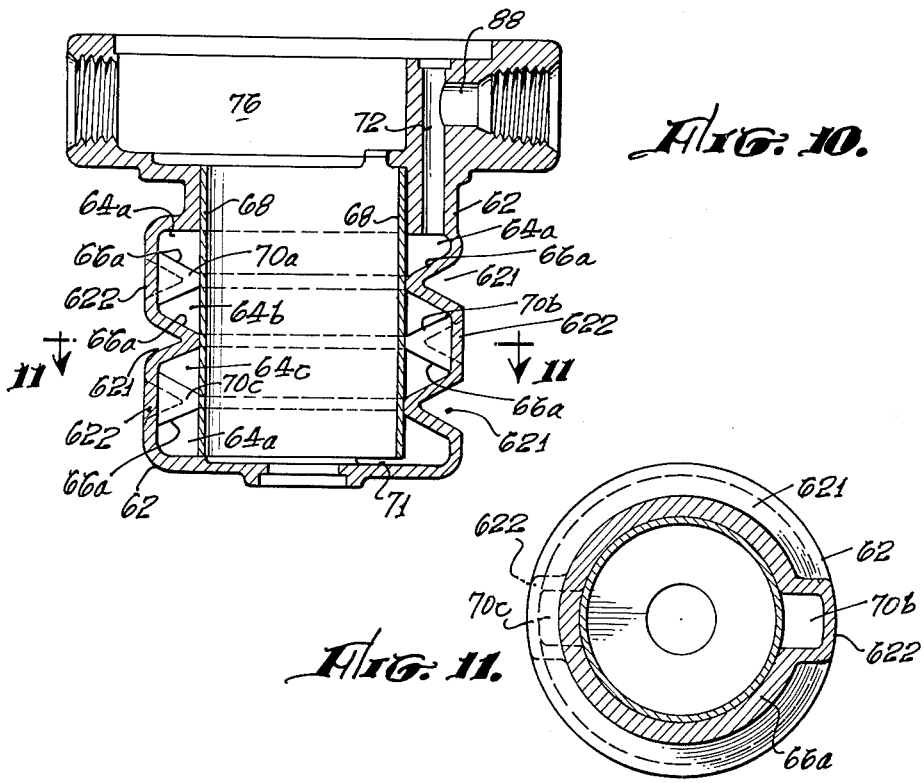
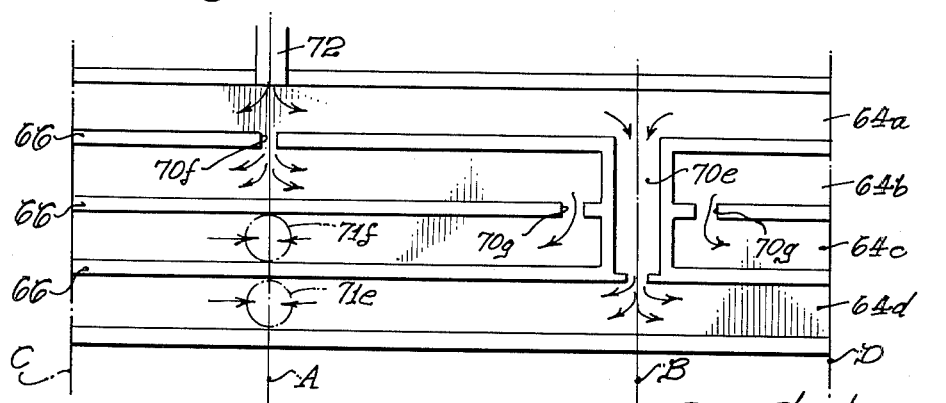
Roy F. Ensign,
INVENTOR.

United States Patent Office 2,988,075
Patented June 13, 1961

2,988,075
COMBINED PRESSURE REGULATOR AND FUEL HEATER AND VAPORIZER
Roy F. Ensign, Fullerton, Calif., assignor to Ensign Carburetor Company, Fullerton, Calif., a corporation of California
Filed June 12, 1959, Ser. No. 820,009
13 Claims. (Cl. 123—120)

This invention relates to pressure regulation and heating and vaporizing of volatile fuels such as butane, particularly but not limitedly, for fuel feed to internal combustion engines. The invention resides in a combined pressure regulator and heater-vaporizer, and also in the heater-vaporizer itself.

The combination includes an arrangement wherein the pressure regulating valve admits fuel to first pass through the heater-vaporizer, to be vaporized before entering the regulator delivery chamber where it exerts its pressure on the valve controlling diaphragm. The fuel is admitted to the heater-vaporizer at a pressure higher than that maintained in the delivery chamber. The fuel is completely vaporized, before entering the body of the regulator proper, in the heater-vaporizer in which heat can be applied to it much more effectively than in the regulator body.

The heater-vaporizer, formed as a unit spaced from but immediately connected with the regulator body, is characterized by having a series of fuel flow channels in curved, preferably circular, form. The fuel flows from channel to channel through restricted openings at increased velocities and corresponding pressure drops, and its flow direction is reversed on entering each successive channel. Those facts, and the centrifugal action which throws the liquid phase of the fuel out against the outer heated wall of the channels, make for large heating and vaporizing capacity in a small and simple heater-vaporizer unit.

The invention will be understood from the following descriptions of several illustrative forms, reference being had to the accompanying drawings, in which:

FIG. 1 is a section showing a combined regulator and heater-vaporizer in an engine water circulation system;

FIGS. 2, 3 and 4 are sections on, respectively, lines 2—2, 3—3 and 4—4 of FIG. 1;

FIG. 5 is a section showing a modification;

FIGS. 6 and 7 are sections respectively on lines 6—6, and 7—7 of FIG. 5;

FIG. 8 is a section showing another modification;

FIG. 9 is a section on line 9—9 of FIG. 8;

FIG. 10 is a section showing another modification of the heater-vaporizer unit;

FIG. 11 is a section on line 11—11 of FIG. 10; and

FIG. 12 is a schematic developed diagram showing another arrangement of the several flow channels and the interconnecting passages.

Referring first to FIGS. 1 to 4, the heater and vaporizer and regulator combination is there shown connected in the water circulation system of an engine, the engine block being indicated at 20, water pump at 22, and radiator schematically at 24. The heater and vaporizer (herein now referred to for short as vaporizer) has an external hollow body 26 which forms the water chamber 28. The inlet 30 of that water chamber is preferably secured, by any suitable means, to the engine block in register with the water circulation outlet 32 of the block. Water is circulated through the block from pump 22 as indicated schematically by the arrows and, with the thermostatically controlled valve 34 open, is circulated through water chamber 28 and out through outlet 36 to the top of radiator 24, and then from the radiator bottom back to the pump. With valve 34 closed, the water flows out of the top of chamber 28 only through the relatively small tube 38 back to the pump. It will be understood that the water passages schematically indicated at 40 and 42, and the valve opening at 34, are much larger than 38, so that the water flow in the closed circuit through 28 and 38 is much smaller than normally through 28 and the radiator. Valve 34 is operated by either, or both, of two thermostatic elements 44 and 46, the former in the outlet 36 beyond valve 34 and the latter in chamber 28. The function of both thermostatic elements is to open valve 34 when the circulating water temperature reaches, say 160° F.; and then circulate the hot water through the engine, chamber 28, and the radiator in relatively large volume. With the engine and the circulating water relatively cold and valve 34 closed, the water is circulated in relatively small volume through 38 only, causing the water temperature to rise quickly. To subject thermostat 44 to the water temperature with valve 34 closed, it may have a small open port 48.

The water circulation system and thermostatic control above described may be applied to any of the variant forms described in connection with FIG. 5 and following as well as to FIG. 1.

The vaporizer unit 60, as shown in FIGS. 1-4, has an outer cast metal body 62 formed with a number of internal peripheral grooves 64, here shown as four—64a, b, c and d. These grooves are separated by internal flanges or ribs 66, and are closed at their inner peripheries by an inserted tube 68. Each groove separating flange 66 has a notch 70, through which the fuel, initially admitted via passage 72 to one of the grooves (the upper one 64a in these figures) flows from groove to groove and finally into groove 64d, and thence through an opening such as 71 into the lower end of tube 68. As explained below, the fuel is heated and vaporized in its passage through the grooves, emerging into 68 in vapor form. The upper end of tube 68 is open to a chamber 76 whose circumferential walls 78 are formed integrally with 62. Chamber 76, closed at its top by diaphragm 80 under a cover 82, forms the delivery chamber of a pressure regulator which comprises that diaphragm and the regulator valve 84 controlled by the diaphragm through pivoted lever 86. Valve 84 controls initial admission of fuel from initial inlet 88 to which the fuel is fed from a source under relatively high pressure. Fuel admitted by valve 84 goes directly via passage 72 to the grooves 64. Typical fuel for which this system has been designed is butane or butane-propane mixture which is held in liquid form under vapor pressure in a source tank; and usual inlet pressures at 88 may be from, say, fifteen p.s.i. up to a pressure considerably higher. Vapor pressure in delivery chamber 76 on diaphragm 80 tends, via lever 86, to close inlet valve 84, and the pressure maintained in chamber 76 is set by the biasing pressures applied to the diaphragm-valve system. The delivery outlet 77 from 76 may go either directly to the engine carbureter at or near atmospheric pressure, or at a higher pressure to a second stage regulator. As here shown, spring 81 exerts a reference pressure on diaphragm 80 so that a regulated pressure above atmospheric is maintained in 76, but always considerably below that at inlet 88. For instance, if the lowest pressure at 88 is, say, fifteen p.s.i., the regulated pressure in 76 may be, say, six p.s.i.

Fuel, typically butane, is initially admitted at valve 84 in liquid form. On admission to 72 there is some pressure drop, but the fuel remains wholly or largely in liquid form at that point, due to temperature drop on partial vaporization. Typically, then the fuel enters the first groove 64a, largely in liquid form, at the point 73 located at one side of the circular groove. From that point the fuel flows in opposite directions (FIGS. 3 and 4) around groove 64a to the notch 70a in the groove-defining flange 66 at a point diametrically opposite 73. Flowing through that notch 70a into circular groove 64b, the fuel then again flows in opposite directions (FIG. 2) about that groove to reach the flange notch 70b located diametrically opposite 70a. Then, through notch 70b the fuel flows into groove 64c where it again flows in opposite directions (FIG. 3) to reach the opposite notch 70c through which it flows into the final groove 64d. There it again flows in opposite directions (FIG. 2) through 64d to reach the opposite opening 71 where it enters tube 68.

Notches 70 are preferably relatively constricted in size. They may increase in size from 70a to 70c (see FIGS. 2 and 3) but their sizes are such that the average flow velocity through the notches is, say, four times the flow velocity around the grooves. That relative flow velocity would mean that the average notch area is one-half the groove cross-sectional area.

The turbulence due to velocity through the notches and reversal of flow direction at each notch, together with the centrifugal action which tends to throw the liquid portion of the flow through the grooves, out against the outer heated wall 62, enables the vaporizer unit 60 to have great vaporizing capacity. The body of the unit is made of heat conducting material, say brass or aluminum, and wall 62 is directly heated by the surrounding hot water in 28. The typical vaporizer shown at full scale in FIG. 1, with initial pressure at 88 as low as fifteen p.s.i. is capable of fully vaporizing fuel for an engine of one hundred horse-power. Turbulence and vaporizing effectiveness may also be increased by roughening the outer wall surfaces of the grooves, the surfaces into contact with which the liquid phase is thrown.

The pressure on the fuel drops as it flows through the several grooves and restricted notches. At each restricted notch the pressure drops and the direction of flow is reversed. The resulting turbulence thoroughly admixes the liquid and vapor portions of the fuel. Then, on curved flow through the next groove, the liquid portions are thrown out against the outer heated wall to be most effectively vaporized. That sequence of actions is repeated until, on flowing into the inner tube 68, the fuel is completely vaporized and at the lowered pressure maintained in delivery chamber 76.

FIGS. 5, 6 and 7 show a modified structure of the vaporizer unit. The parts of FIG. 5 similar to those of FIG. 1 are given the same numerals. In FIG. 5 the inner wall 68a of the circular grooves (corresponding to the inner tube 68 of FIG. 1) is formed as an integral part of the casting and the groove defining flanges 66a extend outwardly from 68a. An outer tube 62a of heat conducting material forms the outer wall of the grooves. The notches 70a, 70b and 70c are the same as in FIG. 1. The final discharge from groove 64d to the interior of 68a is through the opening at 71a located diametrically opposite the notch 70c.

FIGS. 8 and 9 show a modification wherein the fuel flows upwardly from groove to groove, with five grooves rather than four as in FIGS. 1 and 5. Parts similar to those of FIG. 1 have the same numerals. The general formation of the vaporizer unit is the same as in FIG. 1, with an outer integral cast wall 62 and the groove defining flanges 66 projecting inwardly from the wall, and the tube 68 forming the inner wall of the grooves. The grooves and the notches in flanges 66 bear the same relationship as in FIG. 1.

The initial fuel inlet is at 88a at the bottom of the casting 60. Inlet valve 84a is carried on a valve stem 84b guided at 100 and 102 where is passes through the bottom wall 104 and a plate 106 that closes the upper end of inner tube 68. Plate 106 has an opening 108 to pass any leakage through 109 on to the delivery chamber 76. A spring 110 forms part of the diaphragm-valve biasing system to insure valve 84a closing. Valve stem 84b connects directly to diaphragm 80. The pressure regulating action of the diaphragm-valve system is the same as in FIG. 1.

Valve 84a admits the initial liquid fuel to a passage 72a which leads to the opening 73a where the fuel flows into the lowermost circular groove 64d. From that point the fuel flows in opposite directions around 64d to the diametrically opposite notch 70c, thence oppositely around groove 64c to notch 70b, then oppositely around groove 64b to the notch 70a and around groove 64a to notch 70 and then oppositely around the uppermost groove 64 to the diametrically opposite notch 701 in the upper wall of that groove and through that notch into delivery chamber 76. The velocities through the notches and reversals of flow are the same in FIG. 8, and also in FIG. 5, as have been explained in connection with FIG. 1.

In this form of FIG. 8 the coldest, lower, part of the evaporator is located away from regulator body 78, so that undesirable external frosting does not appear on the regulator. In the other figures (e.g. FIG. 1) prevention of frosting on the regulator body is taken care of by spacing the uppermost, coldest, flow groove 64a below the lower wall 78a of the regulator body, with a recessed external groove 78b, to which the hot water has free access, between the cold groove 64a and wall 78a.

FIGS. 10 and 11 show a variant form of the unit 60 of FIG. 1, with a variant flange and groove formation. In the form of these figures the groove defining annular flanges 66a have an angular sectional formation and the exterior surface of outer wall 62 is grooved or depressed inwardly at 621 into each of the annular flanges to give the hot water in chamber 28 more direct heat transfer relation to the flanges and thus increase the heat transfer to fuel flowing in the several grooves. The grooves 64a, b, c and d have the same relation as in FIG. 1, as do also the notches 70a, b, and c. At each of the notches the outer wall 62 is expanded (non-recessed) at 622 to surround the notch. The inner tube 68, forming the inner wall for the grooves, is the same as in FIG. 1. The unit shown in FIGS. 10 and 11 may be directly substituted for the casting unit 60, 78 of FIG. 1, the other parts in that figure remaining the same.

FIG. 12 shows schematically in developed form another arrangement of the several circular grooves and passages (corresponding to the notches) between the grooves. Four grooves 64a, b, c and d, are illustratively shown directions to reach the restricted passage 70e, located 180° apart; the lines at C and D are in identical location on the groove circle.

Fuel enters groove 64a at 72 and there flows in opposite directions to reach the restricted passage 70e, located 180° from 72. Passage 70e leads to groove 64d, where the fuel then again travels in opposite directions to reach the outlet 71e which opens into the inner tube, such as 68 in FIG. 1.

At the same time fuel from 72 and groove 64a flows through the restricted opening 70f into groove 64b. There it travels in opposite directions to reach the restricted openings 70g where the flow directions are again reversed on flow into groove 64c. The fuel then flows in opposite directions around 64c to reach the outlet 71f going into tube 68.

In this form the fuel flow is divided into two streams, each passing through restricted openings from one groove to the next, with increased velocity, pressure drops, and flow direction reversals. The restrictions at 70e and at 70f and g are so related that the two streams preferably have equal flow volumes.

I claim:
1. In a combined pressure regulator and heater-vaporizer for volatile fuels, the combination of structure forming a chamber adapted for passage of a heating fluid, a heater-vaporizer unit extending into said chamber and having a heat conductive wall exposed to the heating fluid therein, elongate fuel flow channel formation within said wall, a fuel inlet and a pressure controlling valve admitting fuel under pressure to one end of the fuel flow channel formation, wall structure and a pressure regulating diaphragm enclosing a delivery chamber in open communication with the other end of the fuel flow channel formation, and means operatively connecting said diaphragm with the pressure controlling valve.

2. The combination defined in claim 1 and in which the fuel flow channel formation is restricted spacedly along its length to cause local increase of fuel velocity and accompanying pressure drops with resulting turbulence in the fuel flow.

3. The combination defined in claim 1 and in which the heater-vaporizer wall is an outer wall of generally cylindric form, and the fuel flow channel formation includes a plurality of axially spaced passages and restricted openings between said passages, said passages being within and immediately adjacent the outer wall, and in which the heater-vaporizer unit includes an inner cylindric wall forming the inner walls of said passages, the interior of said cylindric wall opening directly to the delivery chamber.

4. The combination of claim 1 and also including a water circulation system of an internal combustion engine, including a water pump and a radiator, the heating-fluid chamber being connected in the flow passage of said system between the engine and the radiator and the pump in the flow passage between the radiator and engine, a restricted flow passage connecting directly between the heating-fluid chamber and the pump, and thermostatic means controlling the effective size of the flow passage through said chamber between the engine and the radiator.

5. A heater-vaporizer unit for volatile fuels, comprising in combination an outer wall-enclosed chamber for heating fluid, a vaporizer unit within said chamber and comprising an outer essentially cylindric heat-conductive wall, a series of essentially circular fuel flow passages formed within said wall between axially spaced flanges, a fuel inlet to one of said passages at a predetermined point, an outlet passage leading from said one circular passage, at a point circumferentially removed from the inlet, to another of said circular passages, an inner essentially cylindric wall forming the inner walls of said circular passages, and flow communication from said other circular passage, at a point circumferentially removed from said outlet passage, to the interior of the inner cylindric wall.

6. A heater-vaporizer unit for volatile fuels, comprising in combination an outer wall-enclosed chamber for heating fluid, a vaporizer unit within said chamber and comprising an outer essentially cylindric heat conductive wall, a series of essentially circular fuel flow passages formed within said wall between axially spaced flanges, a fuel inlet to one of said passages at a predetermined point, outlet passages leading from each of said circular passages to form the inlet to another of said circular passages, a final outlet passage leading from one of the circular passages, and said outlets from the several passages being circumferentially removed 180° from their inlets.

7. The combination defined in claim 5 and also including pressure controlling means embodying a valve controlling the flow of fuel through the fuel flow passages.

8. The combination defined in claim 6 and also including pressure controlling means embodying a valve controlling the flow of fuel through the fuel flow passages.

9. The combination defined in claim 5 and in which said outlet passage is restricted in size relative to the cross-sectional sizes of the circular passages.

10. The combination defined in claim 6 and in which each of said outlet passages is restricted in size relative to the cross-sectional sizes of the circular passages.

11. The combination defined in claim 6 and in which there are at least four of said fuel flow passages, in which the outlet from the said one passage leads to a second passage, in which a second outlet from said one passage leads to a third passage from which an outlet leads to a fourth passage, and including final outlets from each of said second and fourth passages.

12. A heater-vaporizer unit for volatile fuels, comprising in combination an outer wall-enclosed chamber for heating fluid, a vaporizer unit within said chamber and comprising an outer essentially cylindric heat conductive wall, an elongate fuel flow channel formation formed within said wall between channel defining axially spaced flanges, said defining flanges being of essentially V-form in section, and the outer face of said wall being depressed into said V-form flanges.

13. In combination with the water circulation system of an internal combustion engine which includes a water circulation pump and a radiator, a heater-vaporizer for volatile fuel in a chamber for heating-fluid forming a part of the circulation system between the engine and the radiator, a restricted flow passage connecting directly between the heating-fluid chamber and the pump, and thermostatic means controlling the effective size of the flow passage through said chamber between the engine and the radiator.

References Cited in the file of this patent
UNITED STATES PATENTS

| | | |
|---|---|---|
| 2,613,658 | Coffey | Oct. 14, 1952 |
| 2,745,727 | Holzapfel | May 15, 1956 |
| 2,752,758 | Tann | July 3, 1956 |
| 2,775,981 | Zonker | Jan. 1, 1957 |
| 2,788,779 | Mengelkamp et al. | Apr. 16, 1957 |